United States Patent [19]
Friedmann et al.

[11] Patent Number: 6,073,644
[45] Date of Patent: Jun. 13, 2000

[54] FLUID-OPERATED REGULATING APPARATUS AND METHOD OF USING THE SAME

[75] Inventors: Oswald Friedmann, Lichtenau; Manfred Homm, Bühl; Michael Genzel, Rosstal, all of Germany

[73] Assignees: Luk Getriebe-Systeme GmbH, Buhl/Baden; Temic Telefunken microelectronik GmbH, Heilbronn, both of Germany

[21] Appl. No.: 08/886,694

[22] Filed: Jul. 1, 1997

[30] Foreign Application Priority Data

Jul. 2, 1996 [DE] Germany .............................. 196 26 520

[51] Int. Cl.[7] .............................. F15B 13/44; F16K 31/12
[52] U.S. Cl. ........................ 137/1; 137/487.5; 251/129.05
[58] Field of Search ...................... 137/487.5, 1, 625.64, 137/102; 251/129.05

[56] References Cited

U.S. PATENT DOCUMENTS

| | | | |
|---|---|---|---|
| 4,898,361 | 2/1990 | Bender | 251/129.05 |
| 5,020,564 | 6/1991 | Thoman | 137/487.5 |
| 5,226,472 | 7/1993 | Benevelli et al. | |
| 5,503,174 | 4/1996 | Schulze | 251/129.05 |

*Primary Examiner*—Gregory L. Huson
*Assistant Examiner*—Joanne Y. Kim
*Attorney, Agent, or Firm*—Darby & Darby

[57] ABSTRACT

A fluid-operated regulating apparatus for use in a motor vehicle, particularly to control the operation of a consumer, such as a clutch which transmits torque between an engine and a transmission in the power train of a vehicle as a function of one or more parameters, comprises at least one pump which supplies a flow of pressurized hydraulic or pneumatic fluid to the consumer by way of a valve controlled by an electronic unit which receives signals from a plurality of sensors. The signals which the electronic unit transmits to the valve are dependent upon at least one variable parameter which is generated by a plurality of components. One of these components is modulated or modulatable at a first frequency, and another of these components is modulated or modulatable at a second frequency which can be higher or lower than the first frequency. This reduces the likelihood of pronounced knocking or chatter of a reciprocable valving element of the valve against its seat and ensures an optimal reduction of hysteresis within the entire operating range of the consumer.

31 Claims, 2 Drawing Sheets

FLUID-OPERATED REGULATING APPARATUS AND METHOD OF USING THE SAME

BACKGROUND OF THE INVENTION

The invention relates to fluid-operated regulating apparatus, especially for use in motor vehicles, and more particularly to improvements in hydraulic or pneumatic apparatus wherein at least one valve, such as a magnetic valve, is adjustable by control means to vary the characteristics of a fluid in a path leading from a pump or another suitable fluid displacing and pressurizing machine to at least one consumer. The valve can be set up to act as a proportional valve, an on-off valve or a multi-way cock.

It is known to resort to pulse-width modulation as a method of controlling the manner in which a valve can influence a pressurized fluid in a path between a source of pressurized fluid and one or more consumers. Such mode of regulation was proposed for the purpose of achieving a reduction of hysteresis. It is also known to achieve a reduction of hysteresis by applying to a valve control signals which are subject to oscillation. Still further, it is known to employ a valve which is influenced by signals subject to frequency changes within the regulating range.

As a rule, hysteresis which develops when a valve is employed in a fluid-operated regulating apparatus exerts an adverse influence upon the operation of such apparatus. On the other hand, if the operation of the valve is controlled by resorting to a control value or parameter having a given frequency which has been found to be desirable because it exerts a positive influence upon the hysteresis, one is likely to adversely influence the mechanical characteristics of the valve. For example, if the valve is controlled by resorting to a low-frequency signal, the valving element is likely to impact upon the seat with a highly pronounced force (chatter). On the other hand, if the chosen frequency of a valve-controlling or regulating signal is too high, the inertia of the mass of the mobile valving element, such as a reciprocable piston or plunger, is likely to be too large to permit the valving element to follow the high-frequency changes of such signals.

OBJECTS OF THE INVENTION

An object of the invention is to provide a fluid-operated (hydraulic or pneumatic) regulating apparatus which is constructed and assembled in such a way that an optimal reduction of hysteresis can be achieved within the entire operating range.

Another object of the invention is to provide an apparatus wherein the chatter or impact(s) of the mobile valving element(s) upon the seat or seats of the valve or valves is or are still below an acceptable threshold value during each and every stage of operation of the apparatus.

A further object of the invention is to provide a simple, compact and inexpensive apparatus which exhibits the above outlined features and advantages.

An additional object of the invention is to provide a motor vehicle with a power train wherein the operation of at least one constituent of the power train is or can be regulated by an apparatus of the above outlined character.

Still another object of the invention is to provide a novel and improved fluid-operated regulating apparatus for a torque transmitting system and/or a transmission in the power train of a motor vehicle.

A further object of the invention is to provide novel and improved valve means for use in the above outlined apparatus.

Another object of the invention is to provide a novel and improved method of operating a hydraulic or pneumatic apparatus for the regulation of clutches, transmissions and/or other constituents of power trains in various types of motor vehicles.

SUMMARY OF THE INVENTION

One feature of the present invention resides in the provision of a fluid-operated (hydraulic or pneumatic) regulating apparatus for use in a motor vehicle. The improved regulating apparatus comprises at least one fluid displacing and pressurizing machine (such as a pump) which is arranged to supply at least one flow or stream of pressurized fluid along a predetermined path to at least one consumer (e.g., to a transmission and/or to a clutch in the power train of the motor vehicle), adjustable fluid pressure regulating valve means in the path, and control means for adjusting the valve means as a function of at least one variable parameter. The at least one parameter is generated by a plurality of components (e.g., by two components); one of the plurality of components is modulated at a first frequency, and another of such plurality of components is modulated at a second frequency.

In accordance with one embodiment of the invention, the at least one parameter is an electric current potential (voltage) and, in accordance with another embodiment, the at least one parameter is an electric current strength (amperage).

The first frequency can be higher than the second frequency; for example, the first frequency can be a whole multiple of the second frequency. Otherwise stated, the duration of a second frequency can be several times the duration of a first frequency.

The at least one parameter can have a modulatable amplitude.

It is also possible to operate the improved apparatus in such a way that the at least one parameter is the pressure of fluid in the predetermined path. For example, the at least one parameter can constitute a pilot control pressure of the valve means or a fluid pressure downstream of a mobile valving element of the valve means.

The control means can be set up to adjust the valve means so as to select a predetermined value of an amplitude of the pressure of fluid as adjusted by the valve means. Again, the at least one parameter can constitute a pilot control pressure of the valve means or a fluid pressure downstream of a mobile valving element of the valve means.

The apparatus can further comprise signal generating means (such as one or more sensors) for monitoring the pressure of fluid in the path and for transmitting the thus generated signals to the control means for the purpose of regulating the amplitude of fluid pressure. The valve means can comprise a preliminary or auxiliary valve arranged to establish a pilot control pressure in the path, and the monitoring means of such apparatus is preferably arranged to generate signals denoting the pilot control pressure. It is also possible to employ valve means comprising at least one adjustable main valving element (e.g., a reciprocable pusher or plunger) in the path, and the monitoring means of such apparatus can be arranged to monitor fluid pressure downstream of the at least one adjustable main valving element.

At least one component of the at least one variable parameter is or can be modulatable as a function of electric current. Furthermore, at least one of the components can have an amplitude which can be raised or lowered as a function of a parameter of the fluid. Still further, at least one of the components is or can be modulatable as a function of a temperature (such as the temperature of the fluid); for example, the amplitude of at least one of the components can be raised or lowered as a function of temperature.

At least one of the first and second frequencies is or can be modulatable. The frequencies can be selected as a function of the operating point of the regulating apparatus or of the motor vehicle. For example, the frequencies can be varied as a function of discrete parameters such as the temperature, the pressure and/or others. It is also possible (and often advisable) to change the pulse duty factor or keying ratio of the valve means as a function of the operating point of the regulating apparatus or the motor vehicle.

One of the components can have a frequency in the range of between about 100 and 1000 Hertz, preferably in the range of between about 200 and 600 Hertz.

As already mentioned above, one of the first and second frequencies can be lower than the other of these frequencies, for example, by a factor of between about 1/3 and 1/50.

Another feature of the invention resides in the provision of a method of adjusting a valve, such as a magnetic valve having at least one magnetic winding, as a function of at least one variable parameter. The improved method comprises the step of generating the at least one variable parameter by a plurality of components having different frequencies. For example, the at least one parameter can constitute or include an exciting current for the winding of a magnetic valve.

The method can further comprise the step of installing the valve in a path for the flow of a fluid from at least one fluid displacing and pressurizing machine (such as the aforementioned pump) to at least one consumer of pressurized fluid in a motor vehicle (e.g., to an automatically adjustable torque transmitting system between a prime mover and a transmission in the power train of a motor vehicle).

A further feature of the instant invention resides in the provision of a fluid-operated regulating apparatus which comprises an adjustable valve disposed in a path for a flow of a pressurizable fluid in a predetermined direction and including at least one mobile valving element arranged to vary the fluid pressure, at least one sensor (monitoring means) arranged to generate signals denoting the pressure of fluid in the path, and means for regulating the amplitude of the pressure of fluid in the path. For example, the at least one sensor can include or constitute means for monitoring an input control pressure of the fluid upstream of the at least one valving element; alternatively, or in addition thereto, the at least one sensor can include or constitute a means for monitoring the pressure of fluid downstream of the at least one valving element.

The novel features which are considered as characteristic of the invention are set forth in particular in the appended claims. The improved fluid-operated regulating apparatus itself, however, both as to its construction and the mode of installing, assembling and utilizing the same, together with numerous additional important and advantageous features thereof, will be best understood upon perusal of the following detailed description of certain presently preferred specific embodiments with reference to the accompanying drawings.

DESCRIPTION OF PREFERRED EMBODIMENTS

Figure 1:
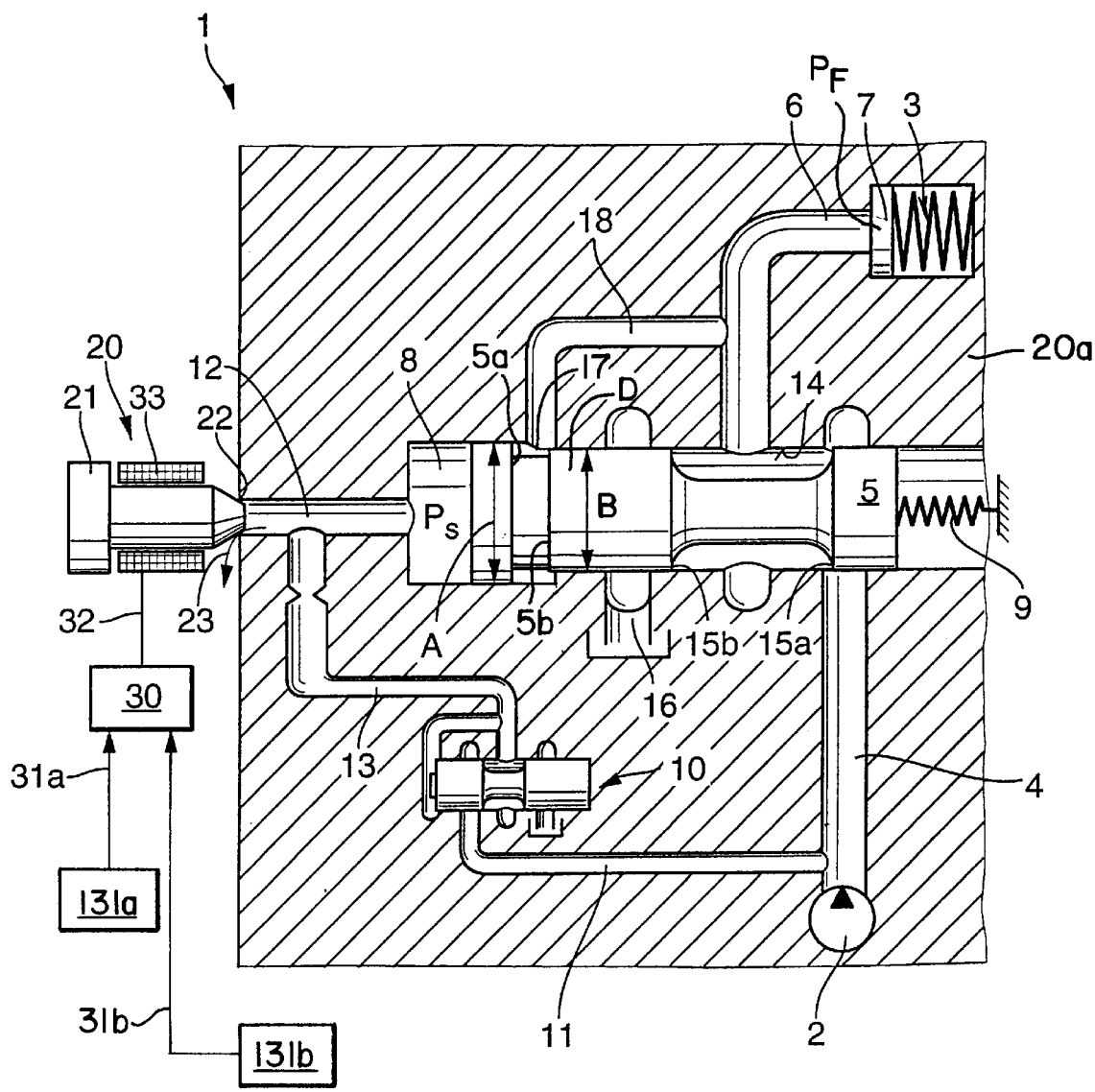
FIG. 1 is a schematic partly sectional view of a fluid-operated regulating apparatus which embodies one form of the invention and is designed to vary the characteristics of a hydraulic fluid serving to regulate or control the operation of a consumer such as a torque transmitting system between the engine and the transmission in the power train of a motor vehicle.

FIG. 1 shows a fluid-operated regulating apparatus 1 which can be utilized with advantage in the power train of a motor vehicle. For example, the apparatus 1 can operate a consumer 3, such as a torque transmitting system between a prime mover and a transmission of a motor vehicle. A torque transmitting system in the form of a friction clutch between the engine and the transmission of a power train in a motor vehicle is shown, for example, in commonly owned U.S. Pat. No. 5,450,934 (granted Sep. 19, 1995 to Paul Maucher for "FRICTION CLUTCH") the disclosure of which is incorporated herein by reference. In addition to constituting a friction clutch, the consumer 3 can constitute a lockup clutch or bypass clutch in a hydrokinetic torque converter, e.g., a lockup clutch of the type disclosed in U.S. Pat. No. 5,377,796 (granted Jan. 3, 1995 to Oswald Friedmann et al. for "APPARATUS FOR TRANSMITTING FORCE BETWEEN ROTARY DRIVING AND DRIVEN UNITS") the disclosure of which, too, is incorporated herein by reference. Still further, the consumer 3 can constitute a starter clutch or a direction reversing clutch. A direction reversing clutch is disclosed, for example, in U.S. Pat. No. 5,169,365 (granted Dec. 8, 1992 to Oswald Friedmann for "POWER TRAIN") the disclosure of which is also incorporated herein by reference.

The apparatus 1 is set up to vary the magnitude of torque which can be transmitted by a clutch (such as the consumer 3) in the power train of a motor vehicle. The illustrated apparatus 1 is assumed to be operated by a hydraulic fluid and comprises at least one pump 2 or an analogous fluid pressurizing and displacing machine. The path from the outlet of the pump 2 to a chamber 7 of the consumer 3 is defined by a conduit 4 leading directly from the outlet of the pump 2, a conduit 6 leading directly to the chamber 7 of the consumer 3, and a hole or bore 14 provided in the housing or body 20a of a valve 20, e.g., a proportional valve, to establish (when necessary) a more or less pronounced connection between the conduits 4 and 6. The purpose of a two-piece valving element 21, 5 of the valve 20 is to select the system pressure in the chamber 7 and hence the magnitude of the torque which can be transmitted by the consumer 3, it being assumed here that the consumer 3 is a clutch between a prime mover and a transmission in the power train of a motor vehicle.

The member 5 (e.g., a reciprocable piston) of the composite valving element 21, 5 of the valve 20 directly controls the flow of pressurized fluid (e.g., oil) from the conduit 4 into the conduit 6 and thence into the chamber 7. On the other hand, the axial position of the piston 5 is determined by the axial position of the second member 21 (e.g., a reciprocable plunger) of the composite valving element 5, 21 of the valve 20. The plunger 21 determines the pressure $P_S$ of fluid in a plenum chamber 8 at the left-hand axial end of the piston 5 in that it controls the rate of escape (if any) of fluid from the chamber 8 by way of a conduit 12 and a seat 22 which latter is engageable by the plunger 21.

A secondary or auxiliary valve 10 is installed in a bypass conduit 11, 13 which connects the conduit 4 with the conduit 12. The character 9 denotes an optional resilient energy storing element (e.g., at least one coil spring) which reacts against the valve body 20a and biases the piston 5 in a direction to the left, as viewed in FIG. 1, namely in a direction to reduce the rate of flow or to interrupt the rate of flow of pressurized fluid from the conduit 4 into the conduit 6.

As a rule, the pressure of fluid in the conduit 13 downstream of the auxiliary valve 10 matches or approximates the pressure $P_S$ in the conduit 12 and plenum chamber 8. The pressurized fluid in the chamber 8 can shift the piston 5 against the opposition of the energy storing element 9 and against the opposition of the fluid acting upon two confronting annular shoulders 5a, 5b in an annular compartment 17 defined by the valve body 20a and connected to the conduit 6 by a further conduit 18. The fluid in the compartment 17 assists the energy storing element 9 in opposing the action of fluid upon the left-hand end face of the piston 5 with a force which is proportional to the difference between the diameters A and B of those portions of the piston 5 which flank the smaller-diameter neck portion D of the piston 5 between the shoulders 5a and 5b.

If the proportional valve 20 is closed, i.e., if the conical tip of the plunger 21 engages the valve seat 22, the fluid medium in the plenum chamber 8 is maintained at a maximum pressure $P_S$ and the rate of possible fluid flow from the conduit 4 into the conduit 6 via bore or hole 14 is high. If the valving element or plunger 21 is caused to move away from actual engagement with the seat 22, e.g., merely for a short interval of time, a certain amount of fluid can escape in the direction of the arrow 23 (for example, into a sump 16 for the pump 2) and the pressure $P_S$ in the chamber 8 drops accordingly.

The piston 5 is provided with two additional shoulders 15a and 15b. The axial position of the shoulder 15a determines the extent of communication between the conduits 4, 6 via bore or hole 14, and the axial position of the shoulder 15b determines whether or not the conduit 6 can communicate with the sump 16. The pressure of fluid in the conduit 6 and chamber 7 drops (e.g., to zero) when the shoulder 15a seals the conduit 4 from the bore or hole 14 but the shoulder 15b establishes a passage for the flow of fluid from the chamber 7 via conduit 6 and bore or hole 14 into the sump 16. The exact axial force acting in the compartment 17 in a direction to assist the energy storing element 9 equals the fluid pressure in the compartment 17 multiplied by the difference between the diameters A and B.

The axial movements of the plunger 21 are initiated by an electronic control unit 30 having an output 32 connected with the winding 33 of the valve 20. The control unit 30 has several inputs (two are shown at 31a and 31b) which are connected to suitable monitoring means or sensors (two sensors 131a, 131b are shown in FIG. 1). As used herein, the term "sensor" or "monitoring means" is intended to encompass electronic and/or other circuits, e.g., those often associated with engines and/or transmissions in motor vehicles. Signals from the control unit 30 via output 32 to the winding 33 can be selected to ensure movements of the plunger 21 to predetermined axial positions relative to the seat 22 and/or to ensure movements of the plunger 21 through predetermined distances.

In order to minimize the hysteresis of the piston 5 when the apparatus 1 is in use, the plunger 21 is imparted an oscillatory movement which, in accordance with a feature of the invention, can be generated by resorting to a control signal which is the result of a superimposition of two components having different frequencies. One component of the control signal (such as a control current) has a relatively high frequency, for example, within the range of between about 100 and 1000 Hertz, preferably between about 200 and 600 Hertz. The other component of the control signal has a lower frequency, preferably smaller than the frequency of the first component by a factor of between 1/3 to 1/50, particularly between about 1/5 to 1/25.

Otherwise stated, the first component of the control signal is modulated with a first chopper frequency, and the second component of the control signal is regulated or controlled with a lower frequency. The current amplitude of the lower-frequency component of the control signal is regulated or controlled for the purpose of ensuring that the composite valving element 21, 5 does oscillate but the plunger 21 does not impact (chatter) against the seat 22 with a pronounced force. For example, the modulation of current amplitude can be effected in such a way that, when the fluid (such as oil) is cold and/or when the intput or pilot control pressures are low, the amplitude of the signals is high but the amplitude is low or nil when the fluid is hot and/or the input or pilot control pressures are high.

In accordance with an additional feature which brings about further improvements, the operation of the control unit 30 can be selected in such a way that the amplitude of oscillation of the valving element in the pilot or servo control circuit or in the valve 20 is regulated or controlled to rise exactly to a value such that the piston 5 barely carries out a certain oscillatory movement. By introducing the pressure amplitude of the main circuit as an input into a slow regulator of the control circuit 30, it is possible to compensate for fluctuations of the hysteresis of individual disturbances as well as variations during the entire useful life of the apparatus 1. Short-lasting variations, for example, as a function of pressure and temperature, are independent of such "slow regulator" of the control circuit 30.

The selection of the control value, such as the control current for the valve 20, for the purposes of reducing the hysteresis in a hydraulic control or regulating apparatus by varying the amplitude of the current, can be carried out by way of the valve 20 at a constant or at a variable basic chopper frequency.

The valve 20 of FIG. 1 is assumed to be a proportional valve. The piston 5 is the main valving element, and the valve 10 is a preliminary or auxiliary or pilot valve or servo valve which latter makes available a control pressure in the region of the conduit 12 and/or in the plenum chamber 8.

Figure 2:
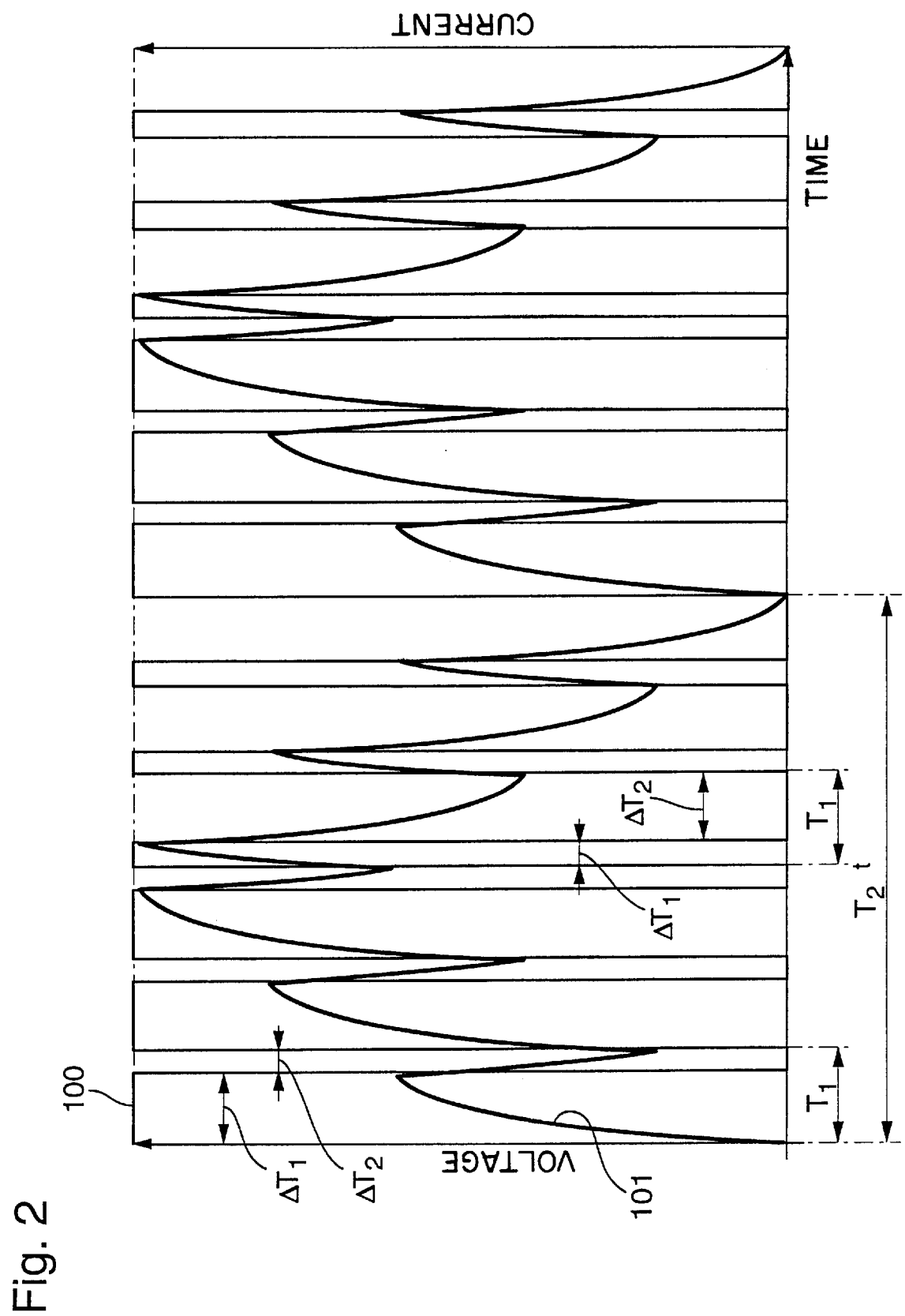
FIG. 2 is a diagram wherein the curves indicate variations of amperage and voltage serving to regulate the operation of a valve in the apparatus of FIG. 1.

FIG. 2 illustrates two signals as a function of time. The curve 100 denotes changes of the voltage of the magnetic valve 20, and the curve 101 denotes changes of the current, both as a function of time. The periods of the high-frequency oscillation or of the high-frequency control signal share are shown at $T_1$, and the duration of a period of the low-frequency component is shown at $T_2$. The duration of the period of the low-frequency signal share or component, which is shown at $T_2$, is a multiple of (e.g., exactly seven times) the duration of a period $T_1$ of the high-frequency oscillation of the high-frequency signal component.

Within a period $T_1$, the voltage denoted by the curve 100 reaches a maximum value after the elapse of an interval $\Delta T_1$, and is essentially zero after the elapse of the immmediately following interval $\Delta T_2$ of the same period $T_1$. The ratio of $\Delta T_1$ to $\Delta T_2$ denotes the mark space ratio or pulse duty factor; a full signal is available during the interval $\Delta T_1$, and the signal is basically zero after the elapse of the immediately following interval $\Delta T_2$ of each period $T_1$. The voltage signal reaches a maximum value after elapse of the interval $\Delta T_1$, the value of the current (refer to the curve 101) rises from basically zero to a predeterminable value during the interval $\Delta T_1$ but the current decreases again during the interval $\Delta T_2$. During the next period $T_1$, the current increases at first to thereupon decrease again but the average current increases. The pulse duty factor $\Delta T_1$ to $\Delta T_2$ can be resorted to for the selection or regulation of the average current. During the first three periods $T_1$, the duration of $\Delta T_1$ basically exceeds $\Delta T_2$; however, starting with the fourth period $T_1$ (at t), the pulse duty factor $\Delta T_1$ to $\Delta T_2$ is changed and the interval $\Delta T_1$ is shorter than the interval $\Delta T_2$. This renders it possible to ensure that the average current decreases during the period $T_1$. Thus, a modulation of the amplitude, namely a modulation of the pulse duty factor $\Delta T_1$ to $\Delta T_2$, renders it possible to achieve a modulation of the average control current.

FIG. 2 shows clearly that the modulated increase and lowering of the current as a function of time, as well as that a long-wave oscillation, is superimposed upon the high-frequency rise and lowering of the current. When the pilot or input control pressure in the chamber 8 of the valve 20 shown in FIG. 1 is low, the amplitude of the oscillations can be high because a low pressure denotes that the plunger 21 is located at a relatively great distance from the seat 22, i.e., that the valve is open to a relatively large extent. Due to such pronounced opening of the valve 20, it is possible to achieve rather pronounced reciprocatory movements of the valving element 21 without risking strong (forcible) impacts (chatter) of the element 21 against the seat 22. If the pressure of fluid in the chamber 8 is higher, the amplitude of the displacement modulation of the plunger 21 should be less pronounced if a forcible impact (pronounced chatter) of the plunger 21 against the seat 22 is to be avoided. The impact against the seat 22 is more problematic at elevated fluid pressures because the valve 20 is open to a lesser extent and, therefore, the plunger 21 is apt to strike against the seat 22 even at low distance or movement modulations.

One of the sensors 131a, 131b can transmit to the control unit 30 signals denoting pilot control pressure of the valve 10 or 20, and the other of these sensors can transmit signals denoting the fluid pressure downstream of the piston 5 (as seen in the direction of fluid flow from the pump 2). Furthermore, at least one of the sensors 131a, 131b (or one or more additional sensors, not specifically shown) can include means for transmitting to the control unit 30 signals denoting the temperature of the fluid in a selected portion of the path for the flow of fluid from the pump 2 to the consumer 3 and/or to the seat 22 and/or to the sump 16 and/or to the valve 10.

Unless otherwise stated, the terms "control" and "regulate" are used interchangeably in the specification, claims and abstract.

The selection of a control signal or of a control value with a signal which consists of two oscillation components is shown in FIG. 2. In addition to the illustrated modulation of the pulse duty ratio, it is also possible to carry out a modulation of the amplitude of the high-frequency or low-frequency oscillation, for example, as a function of the current or control pressure or other operational parameters. It is also possible to carry out a frequency modulation of the low-frequency or high-frequency oscillation, for example, as a function of the current or the control pressure or another operational parameter.

If the proportional valve 20 is controlled or operated by a signal which includes a high-frequency component and a low-frequency component, the piston 5 normally responds to or follows only the low-frequency component because, as a rule, the inertia of the piston 5 prevents it from carrying out a high-frequency movement.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of fluid-operated regulating apparatus and, therefore, such adaptations should and are intended to be comprehended within the meaning and range of equivalence of the appended claims.

What is claimed is:

1. A fluid-operated control apparatus for use in a motor vehicle, comprising at least one fluid displacing and pressurizing machine arranged to supply at least one flow of pressurized fluid along a predetermined path to at least one consumer of a motor vehicle; adjustable fluid pressure regulating valve means in said path, said valve means including a proportional valve; and control means for modulating current amplitude of said valve means as a function of at least one variable control parameter, said at least one control parameter being generated by a plurality of components, one of said components being modulated at a first frequency and another of said components being modulated at a second frequency.

2. The apparatus of claim 1, wherein said fluid is a hydraulic fluid.

3. The apparatus of claim 1, wherein said at least one machine comprises a pump.

4. The apparatus of claim 1, wherein said at least one parameter is an electric current potential.

5. The apparatus of claim 1, wherein said at least one parameter is an electric current strength.

6. The apparatus of claim 1, wherein said at least frequency is higher than said second frequency.

7. The apparatus of claim 1, wherein said at least frequency is a whole multiple of said second frequency.

8. The apparatus of claim 1, wherein said at least one parameter has a modulatable amplitude.

9. The apparatus of claim 1, wherein said at least one parameter is a pressure of the fluid in said path.

10. The apparatus of claim 9, wherein said at least one parameter is a pilot control pressure of said valve means.

11. The apparatus of claim 9, wherein said at least one parameter is a fluid pressure downstream of a mobile valving element of said valve means.

12. The apparatus of claim 9, wherein said control means is arranged to adjust said valve means so as to select a predetermined value of an amplitude of the pressure of fluid as adjusted by said valve means.

13. The apparatus of claim 12, wherein said at least one parameter is a pilot control pressure of said valve means.

14. The apparatus of claim 12, wherein said at least one parameter is a fluid pressure downstream of a mobile valving element of said valve means.

15. The apparatus of claim 9, further comprising signal generating means for monitoring said pressure of fluid in said path and for transmitting the thus generated signals to said control means to regulate the amplitude of fluid pressure.

16. The apparatus of claim 15, wherein said valve means further comprises a preliminary valve arranged to establish a pilot control pressure in said path and said monitoring means is arranged to generate signals denoting said pilot control pressure.

17. The apparatus of claim 15, wherein said proportional valve comprises at least one adjustable main valving element in said path and said monitoring means is arranged to monitor fluid pressure downstream of said at least one valving element.

18. The apparatus of claim 1, wherein at least one of said components is modulatable as a function of electric current.

19. The apparatus of claim 1, wherein at least one of said components has an amplitude which can be raised or lowered as a function of a parameter of the fluid.

20. The apparatus of claim 1, wherein at least one of said components has an amplitude which can be raised or lowered as a function of a temperature.

21. The apparatus of claim 1, wherein at least one of said components has an amplitude which can be raised or lowered as a function of a temperature.

22. The apparatus of claim 1, wherein at least one of said first and second frequencies is modulatable.

23. The apparatus of claim 1, wherein one of said components has a frequency in the range of between about 100 and 1000 Hertz.

24. The apparatus of claim 23, wherein said range is between about 200 and 600 Hertz.

25. The apparatus of claim 1, wherein one of said first and second frequencies is lower than the other of said first and second frequencies by a factor of between about $1/3$ and $1/50$.

26. A method for operating a fluid-operated control apparatus for use in a motor vehicle, said control apparatus including at least one fluid displacing and pressurizing machine arranged to supply at least one flow of pressurized fluid along a predetermined path to at least one consumer of a motor vehicle, and a magnetic proportional valve in said fluid path having a winding for modulating current amplitude of said magnetic proportional valve as a function of at least one variable parameter, comprising the step of generating the parameter by a plurality of components having different frequencies.

27. The method of claim 26, wherein said parameter is an exciting current.

28. The method of claim 26, further comprising the step of installing the magnetic proportional valve in a path for the flow of a fluid from at least one fluid displacing and pressurizing machine to at least one consumer of pressurized fluid in a motor vehicle.

29. A fluid-operated regulating apparatus for use in a motor vehicle comprising at least one fluid displacing and pressurizing machine arranged to supply at least one flow of pressurized fluid along a predetermined path to at least one consumer of a motor vehicle; adjustable valve means disposed in the path for a flow of a pressurizable fluid in a predetermined direction and including a proportional valve having at least one mobile valving element arranged to vary the fluid pressure; at least one sensor arranged to generate signals denoting the pressure of fluid in said path; and means for regulating the current amplitude of the pressure of fluid in said path.

30. The apparatus of claim 29, wherein said at least one sensor includes means for monitoring an input control pressure of the fluid upstream of said at least one valving element.

31. The apparatus of claim 29, wherein said at least one sensor includes means for monitoring the pressure of fluid downstream of said at least one valving element.

* * * * *